United States Patent Office 3,641,041
Patented Feb. 8, 1972

3,641,041
DIPYRIDYLIUM QUATERNARY DIHALIDE HALOGEN COMPLEXES
Robert M. Thomas, Fred R. Gerns, and John L. Sands, West Lafayette, Ind., assignors to Great Lakes Chemical Corporation, West Lafayette, Ind.
No Drawing. Filed Oct. 23, 1968, Ser. No. 770,082
Int. Cl. C07d 31/42
U.S. Cl. 260—296 T                                             2 Claims

ABSTRACT OF THE DISCLOSURE

Halogen complexes of dipyridylium quaternary dihalide are bacteriocidal and herbicidal agents and are useful as defoliants, particularly as cotton defoliants.

---

This invention relates to novel quaternary dihalide halogen complexes, more particularly to halogen complexes of N,N'-alkylene-dipyridylium dihalides and N,N-dialkyl-dipyridylium dihalides, and to their use as defoliants, particularly as cotton defoliants.

OBJECTS OF THE INVENTION

It is an object of the invention to provide novel dipyridylium quaternary dihalide halogen complexes. Another object is the provision of a method for their use as defoliating agents. Other objects will be apparent to those skilled in the art to which this invention pertains.

BACKGROUND OF INVENTION

Halogen addition products of quaternary halides are known in the art. They have been used to sterilize water (U.S. 3,152,073), as germicidal detergents (U.S. 2,746,-928), as anti-bacterial and anti-fungal agents (U.S. 2,868,-686) and as germicides (U.S. 3,028,301, U.S. 2,679,533). Two of the dipyridylium dihalides used as starting materials to produce the novel halogen complexes of this invention, viz, N,N'-ethylene-2,2'-dipyridylium dibromide and N,N'-dimethyl-4,4'-dipyridylium dichloride, are used commercially as herbicides. (See U.S. 2,823,987 and U.S. 2,972,528. See also U.S. 3,202,500 and U.S. 3,332,959.)

DESCRIPTION OF THE INVENTION

The following is a description of the manner of making and using and the best mode contemplated of carrying out the invention.

The quaternary dihalide halogen complexes of this invention are herbicides. In contradistinction to the starting quaternary dihalides, they are defoliating heribicidal agents and are especially useful as cotton defoliants. Those which are bromine complexes are particularly useful for this purpose. The discovery that the herbicidal activity of the starting quaternary dihalides is converted by their conversion to the halogen complexes of this invention from essentially only desiccation to defoliation is of substantial importance in the cotton industry because defoliation better prepares the mature cotton plants for mechanical harvest by reducing the trash (desiccated leaves) collected along with the cotton bolls. This up-grades the quality of the harvested cotton. Another critical factor in the use of a herbicide as a harvest aid is its effect on the opening of the cotton bolls. The halogen complexes of this invention are superior to the starting quaternary dihalides in this respect. Their defoliating activity also renders them useful to rapidly clear jungle areas and railroad and utility right-of-ways.

The halogen complexes of this invention have anti-microbial activity and can therefore be used as anti-bacterial and soil anti-fungal agents. They are active against gram positive and gram negative bacteria.

The compounds of this invention can be used as defoliants by applying them to the area to be defoliated in an amount effective to at least substantially defoliate the flora of the treated area. Generally, up to 4 pounds per acre is employed. Higher amounts are also effective but are wasteful and unnecessarily expensive and ordinarily do not result in increased defoliation. Generally, an amount of the selected compound between about 0.1 and 2.0 pounds per acre, preferably between 0.2 and 1.0 lb./acre, is employed, the exact amount depending on the type of plants to be defoliated, their density and the percentage lost by drift during application. For example, mature cotton plants planted at normal densities can be sufficiently defoliated (85 percent) to permit mechanical picking with almost no pin trash by applying N,N'-ethylene-2,2'-dipyridylium dibromide dibromine complex uniformly thereto at a rate of 0.125 to 0.2 lb./acre. At higher treatment levels (0.25 to 2 lbs./acre) 95–98 percent defoliation can be achieved.

In order to apply the halogen complex uniformly, whether as an anti-microbial agent or herbicide, it is usually applied in combination with an inert or synergizing carrier. Because the complex can rapidly lose its elemental halogen in the presence of readily halogenated compounds, if the carrier is susceptible to halogenation, it is usually mixed with the halogen complex just prior to its application to the flora to be defoliated or applied dry mixed with a powder carrier which will adhere to the plants. It can be applied as a suspension in water or in a non-ionic carrier, e.g., gasoline, kerosene or light oil.

Except for their water and most organic solvent insolubility and their ability to halogenate compounds mixed therewith which are readily halogenatable with elemental halogen, the compounds of this invention can be used as herbicides in the same manner as known herbicides, e.g., the corresponding starting dipyridylium quaternary dihalides. For a description of such a manner of using, see U.S. 3,202,500 and 3,332,995.

The compounds of this invention can be represented by the following generic structural formula:

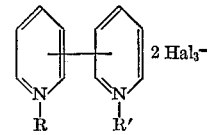

wherein R and R' are lower-alkyl of from 1 to 8 carbon atoms and preferably 1 to 3 atoms, inclusive, when the dipyridylium group is 3,3'- or 4,4'-dipyridylium, and collectively alkylene of from 1 to 4 carbon atoms and preferably 2 or 3 carbon atoms, inclusive, when the dipyridylium group is 2,2'-dipyridylium; $Hal_3^-$ is a trihalide ion in which the halogen has an atomic weight from 35 to 80, inclusive, e.g., $Br_3^-$, $ClBr_2^-$, $Cl_2Br^-$, preferably $Br_3^-$. For example, the dipyridylium moiety can be 2,2'-, 3,3'-, 4,4'- or mixtures thereof. When the dipyridylium group is 3,3'- or 4,4'-, R and R' each can be $CH_3$, $C_2H_5$, n-$C_3H_7$, i-$C_3H_7$, t-butyl, octyl. When the dipyridylium group is 2,2'-, R and R' collectively can be mehtylene, ethylene, trimethylene, propylene, etc. The halogen in $Hal_3^-$ can be chlorine, bromine or a combination of chlorine and bromine.

It will be apparent to those skilled in the art that although it is generally accepted that elemental and anionic halogen combine to form the trihalide anion [$Hal_3^-$], because the halogen is only loosely bonded, the formula $Hal^- \cdot Hal_2$ also reasonably accurately defines the trihalide complex.

The following are representative compounds of this invention defined by the above formula:

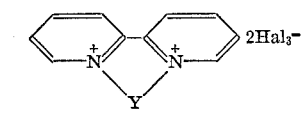

| Compound | Y | Hal₃⁻ |
|---|---|---|
| 1 | CH₂ | Br₃⁻ |
| 2 | CH₂ | ClBr₂⁻ |
| 3 | C₂H₄ | Br₃⁻ |
| 4 | C₂H₄ | ClBr₂⁻ |
| 5 | C₂H₄ | Cl₂Br⁻ |
| 6 | C₂H₄ | Cl₃⁻ |
| 7 | (CH₃)C₂H₃ | Br₃⁻ |
| 8 | C₃H₆ | Br₃⁻ |
| 9 | C₃H₆ | ClBr₂⁻ |
| 10 | C₃H₆ | Cl₂Br⁻ |

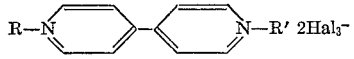

| Compound | R | R' | Hal₃⁻ |
|---|---|---|---|
| 11 | CH₃ | CH₃ | Br₃⁻ |
| 12 | CH₃ | CH₃ | ClBr₂⁻ |
| 13 | CH₃ | CH₃ | Cl₂Br⁻ |
| 14 | CH₃ | CH₃ | Cl₃⁻ |
| 15 | C₂H₅ | C₂H₅ | Br₃⁻ |
| 16 | C₂H₅ | C₂H₅ | ClBr₂⁻ |
| 17 | C₂H₅ | C₂H₅ | Cl₂Br⁻ |
| 18 | n-C₃H₇ | n-C₃H₇ | Br₃⁻ |
| 19 | i-C₃H₇ | i-C₃H₇ | Br₃⁻ |

The presence of non-interfering functional groups on the alkyl groups attached to the nitrogen atoms of the 3,3'- and 4,4'-dipyridylium molecules and/or an alkyl group on one or more of the dipyridylium ring carbon atoms will not affect the usefulness of the dipyridylium dihalide halogen complexes as halogenating and herbicidal agents. Such substituted compounds are therefore equivalents of the corresponding unsubstituted compounds. For example, the 2,2'-dipyridylium compounds can have a lower-alkyl, preferably methyl, group at one or more of the 4, 5, 6, 4', 5' and 6' positions and the 4,4'-dipyridylium compounds at one or more of the 2, 3, 5, 6, 2', 3', 5' and 6' positions, and one or both but preferably only one of R and R' is lower-alkyl in which the terminal carbon atom is substituted, e.g., with halogen, carboxyl, carbo-lower-alkoxy, phenyl, substituted phenyl, e.g., halophenyl, bromophenyl, nitrophenyl, tolyl, xylyl, etc.

The compounds of this invention are solids, usually crystalline and colored when they are formed from elemental halogen. They are substantially insoluble in water and most organic solvents. The elemental halogen used to form the trihalide anion is titratable and, when formed from two molar equivalents of halogen, the titer is usually 80–98 percent of theory. Because the halogen is titratable, they can be used as halogenating agents.

The compounds of this invention are prepared by mixing about two molar equivalents of the selected halogen or mixture of halogens, e.g., Cl₂, Br₂, ClBr, with the selected starting diquaternary halide. This can be conducted in the presence of a solvent normally used for halogenation reactions, e.g., glacial or aqueous acetic acid, chloroform, carbon tetrachloride, water or aqueous NaBr or NaCl. The choice of solvent is determined by the solubility of starting quaternary salt in it. For this reason, aqueous systems are generally preferred.

The reaction is preferably conducted at between −10° and 25° C., the lower temperature limit being determined by the solubility of the reactants in the selected solvent system and the upper temperature limit being determined by the rate of decomposition of the product and/or side reactions which may develop at higher temperatures.

If a mixed elemental halogen complex is desired, the halogens can be added concurrently or successively in amounts calculated to produce the desired molar ratio. For example, the selected starting quaternary dichloride or dibromide can be mixed first with one molar equivalent of chlorine followed by a molar equivalent of bromine or with two molar equivalents of chlorobromide to produce the chlorobromine complex (ClBr₂⁻ or BrCl₂⁻).

If the starting quaternary dihalide is a dichloride, simultaneously with the formation of the halogen complex it can be reacted with two molar equivalents of NaBr or KBr to form the quaternary dibromide salt. Reaction with one molar equivalent of the salt produces a mixed quaternary dihalide.

The starting quaternary dihalides are prepared by reacting 2,2'-, 3,3'- or 4,4'-dipyridyl with an amount of the selected alkylating agent sufficient to quaternize both nitrogen atoms. Thus, at least two molar equivalents of the selected alkyl chloride or bromide and at least one molar equivalent of the selected alkylene dichloride or dibromide is employed. Ordinarily, a large excess of these amounts is employed. Conventional quaternizing conditions are used. See U.S. 2,823,987, 3,202,500 and 3,332,959, Homer et al., J. Chem. Soc. (1960) 2498.

The following illustrate the making and using of the compounds of this invention which is not limited thereto.

Preparation N,N'-trimethylene-2,2'-dipyridylium dibromide

A mixture of 2,2'-dipyridyl (0.077 mole) and 1,3-propylene dibromide (0.39 mole) was stirred under reflux for 15 hours. Acetone was added and the product which precipitated was collected by filtration, recrystallized and decolorized with Darco activated charcoal in boiling methanol. The product was isolated in 94 percent yield in two crops melting at 322° and 317°, respectively.

EXAMPLES 1–3

The complexes shown in Table I were prepared by the addition of a solution of the corresponding dipyridylium quaternary dibromide in water to a solution of two molar equivalents of bromide in aqueous NaBr at room temperature.

For example, N,N'-ethylene-2,2'-dipyridylium dibromide dibromine complex was prepared by adding with stirring a solution of 760 g. (0.78 M) of "Diquat" brand of N,N'-ethylene-2,2'-dipyridylium dibromide to 249 g. of bromine in 1500 ml. of H₂O containing 200 g. NaBr. The complex which precipitated immediately was collected, washed with water and air dried, yielding 962 g. combined yield of two replicate reactions (92.5 percent), of the dibromine complex. Halogen titration with KI thiosulfate in the usual way showed 94.5 percent of theory of titratable halogen.

TABLE I

| | Structure | Yield, percent | M.P., °C. | Percent Br₂ by weight | Br₂ titer, percent theory |
|---|---|---|---|---|---|
| 1 | (2Br₃⁻ structure) | 35 | 170–185 | 48 | 90 |
| 2 | (2Br₃⁻ structure) | 80 | 161–163 | 47 | 98 |
| 3 | CH₃—N⁺ ... ⁺N—CH₃ 2Br₃⁻ | 88 | 255(d) | 48 | 95 |

USE AS COTTON DEFOLIANTS

The bromine complexes of Examples 1 and 3 were field tested as cotton defoliants under the code numbers 506 and 514, respectively.

Because of their insolubility in water and other common solvents, the test compounds were made up into 50 percent wettable powder formulations for field test purposes. Ten percent emulsion concentrates in DMF were also prepared using as emulsifier 10 percent of a 50:50 ratio of Span and Tween 80. Only 506 was in complete solution in this emulsifiable concentrate. About 1 to 2 percent solids appeared to precipitate in the case of the 10 percent emulsion concentrate of 514. Because the complex decomposes in this carrier, it was made up just prior to use.

The field application was made on October 18 near Greenville, Miss. The application was tractor applied by means of overhead nozzles (no drop nozzles) at a gallonage of 39 g.p.a., a pressure of 25 p.s.i. to reduce drift in the wind since the wind at the time of application was approximately 10 m.p.h. with gusts up to 15 m.p.h.

The cotton used in the test was Stoneville 213 planted on a 4 x 4 scheme with rows 60 feet in length. At the time of treatment, the cotton was 4 or 5 feet in height with 60 to 70 percent open bolls. From the general appearance of the field, an estimate of final yield would be on the order of one and one-half bales per acre. The test plots were randomized consisting of 60 foot rows with 3 replicates. The field and the final results were very uniform and consistent.

First records were made on October 24, with final defoliation data obtained on November 4.

On October 24 data were recorded P.R. (phytotoxicity rating) using a scale of 0 to 10 in which 10 indicates all leaves were killed and 0 indicates no effect. Percent defoliation (DEF) and percent desiccation (DES) was also determined. Final data on defoliation were recorded on November 4. Because of a severe frost which occurred the night before, it was not possible to obtain final data on percent desiccation. Some herbicides are so phytotoxic they inhibit the natural opening of the bolls, which is a very serious detriment to their use as a harvest aid on cotton. Therefore, on November 10, a count was made on the number of unopened bolls per plant. Data accumulated in the field are recorded in Table II.

From the P.R. values there appeared to be no significant difference between any of the materials tested with respect to phytotoxicity to the leaves and the plants, except at the low treatment level of ¼ lb./acre where 506 and 514 were measurably more phytotoxic than "Diquat" (N,N'-ethylene - 2,2' - dipyridylium dibromide) and "Paraquat" (N,N'-dimethyl-4,4'-dipyridylium dichloride). However, very significant differences in percent defoliation can be observed. In the case of Paraquat and Diquat, six days after application there was essentially no defoliation at effective herbicidal dosage levels (phytotoxicity rating of at least 7). Their action was essentially desiccation only. On the same date, both 506 and 514 produced 80–90 percent defoliation so that a very marked and significant difference between the action of 506 and 514 and the action of the commercial herbicides "Diquat" and "Paraquat" was apparent.

On November 4, both 506 and 514 had produced 98 percent plus defoliation at the 2 pounds per acre level of application and 90 to 95 percent defoliation at one-half pound per acre. 514 as a wettable powder produced 90 percent defoliation, even at the ¼ pound per acre rate.

On November 10, very significant data was obtained with respect to bolls opening. With 514 and 506, complete opening of the bolls occurred at all dose levels. With "Diquat" and "Paraquat" a high number of bolls remained unopened at their most effective phytotoxic levels.

What is claimed is:

1. An N,N'-trimethylene - 2,2' - dipyridylium dihalide halogen complex of the formula

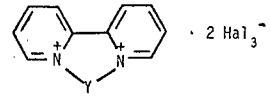

wherein $Hal_3^-$ has an atomic weight from 35 to 80, inclusive, and Y is trimethylene.

2. N,N' - trimethylene-2,2'-dipyridylium hexabromide having the formula

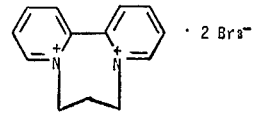

(References on following page)

TABLE II.—DEFOLIANT ACTIVITY OF 506 AND 514

| Chemical formulation | Rate, lbs./acre | October 24 P.R. | October 24 Percent DEF | October 24 Percent DES | Nov. 4, percent DEF | Nov. 10, avg. No. of unopened bolls/plant |
|---|---|---|---|---|---|---|
| 514 DMF (10% E.C.) | 2 | 10 | 50(1) | 50 | 98+ | 0 |
|  | 1 | 10 | 75 | 25 | 85 | 0 |
|  | ½ | 9+ | 85 | 15 | 90 | 0 |
|  | ¼ | 7 | 80(4) | 0 | 80 | 0 |
| 506 DMF (10% E.C.) | 2 | 10 | 75 | 25 | 98 | 0 |
|  | 1 | 10 | 60 | 40 | 98 | 0 |
|  | ½ | 9+ | 80 | 20 | 95 | 0 |
|  | ¼ | 7 | 85(4) | 0 | 85 | 0 |
| 514 50% wettable powder | 2 | 10 | 80 | 20 | 98 | 0 |
|  | 1 | 10 | 60 | 40 | 80 | 0 |
|  | ½ | 9+ | 85 | 15 | 90 | 0 |
|  | ¼ | 7 | 90 | 0 | 90 | 0 |
| 506 50% wettable powder | 2 | 10 | 10 | 90 | 98 | 0 |
|  | 1 | 10 | 10 | 90 | 85 | 0 |
|  | ½ | 9+ | 85 | 15 | 90 | 0 |
|  | ¼ | 7 | 100T(2), 20B | 0 | 100T, 20B | 0 |
| PARAQUAT (4 lbs./gal.) (N,N'-dimethyl-4,4'-dipyridylium dichloride). | 2(3) | 10 | 0 | 100 | 30 | 6 |
|  | 1(3) | 10 | 0 | 100 | 50 | 6 |
|  | ½ | 10 | 60 | 40 | 80 | 2 |
|  | ¼ | 5 | 100T, 50B | 0 | 100T, 50B | 0 |
| DIQUAT (4lbs./gal.) (N,N'-ethylene-2,2'-dipyridylium dibromide). | 2(3) | 10 | 0 | 100 | 25 | 8 |
|  | 1(3) | 10 | 0 | 100 | 25 | 6 |
|  | ½ | 9 | 20 | 80 | 40 | 0 |
|  | ¼ | 4 | 50T, 0B | 35T, 40B | 50T, 0 | 0 |

T=Top Leaves
B=Bottom Leaves
(1) Leaves partially loose
(2) Apparently not enough chemical reached bottom leaves
(3) Some "burn" on green bolls
(4) ¼ lb. rate would have picked very well with this degree of defoliation with almost no pin trash.

References Cited

UNITED STATES PATENTS 3,202,500  8/1965  Homer _____ 71—94

FOREIGN PATENTS 1,078,846  8/1967  Great Britain _____ 260—268

ALAN L. ROTMAN, Primary Examiner

U.S. Cl. X.R.

260—296 D, 268 TR; 71—94